No. 626,000. Patented May 30, 1899.
L. D. BURLINGHAM.
DOUGH RAISER APPARATUS.
(Application filed Dec. 8, 1898.)

(No Model.)

Witnesses

L. D. Burlingham, Inventor

By his Attorneys,

THE NORRIS PETERS CO., PHOTO-LITHO., WASHINGTON, D. C.

UNITED STATES PATENT OFFICE.

LUCIOUS D. BURLINGHAM, OF BERLIN, PENNSYLVANIA, ASSIGNOR OF ONE-HALF TO HENRY WEYAND, OF SAME PLACE.

DOUGH-RAISER APPARATUS.

SPECIFICATION forming part of Letters Patent No. 626,000, dated May 30, 1899.

Application filed December 8, 1898. Serial No. 698,630. (No model.)

*To all whom it may concern:*

Be it known that I, LUCIOUS D. BURLINGHAM, a citizen of the United States, residing at Berlin, in the county of Somerset and State of Pennsylvania, have invented a new and useful Dough-Raiser Apparatus, of which the following is a specification.

My invention relates to a dough-raiser adapted to facilitate maintaining a uniform temperature for inducing the raising of dough both in the form of sponge, as subsequent to the mixing operation, and subsequently after the dough has been molded and placed in the bake-pans; and the object in view is to provide a simple, compact, and efficient cabinet provided with a compartment for flour, supports for a dough-tray and bake-pans and for a receptacle adapted to contain a heating agent, and also provided with means for regulating the communication of heat from one compartment to another.

Further objects and advantages of this invention will appear in the following description, and the novel features thereof will be particularly pointed out in the appended claims.

Figure 1:
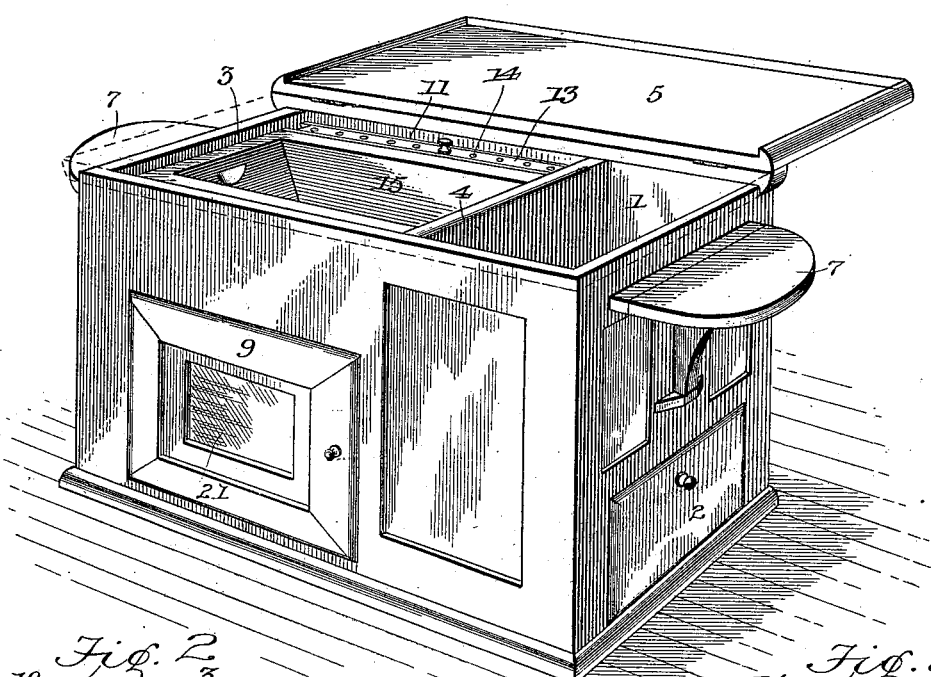
Figure 2:
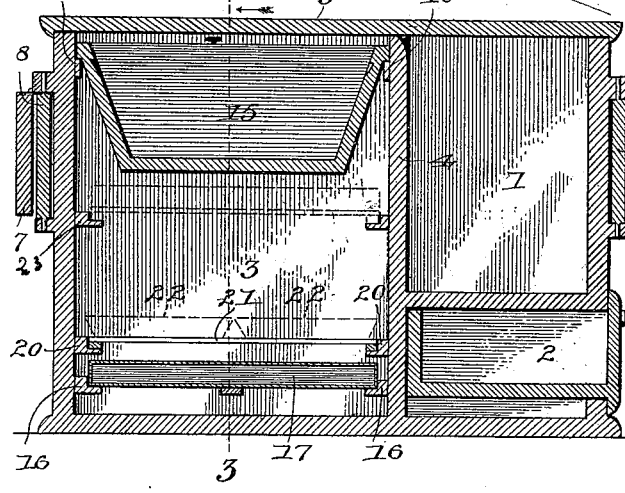
Figure 3:
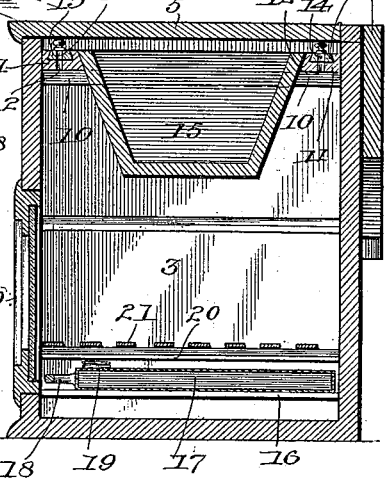

In the drawings, Figure 1 is a perspective view of a cabinet constructed in accordance with my invention, the lid which forms the kneading-board being shown in full lines in its open position and in dotted lines in its closed position. Fig. 2 is a longitudinal section of the cabinet, the hot-water receptacle being shown in full lines in the position which it occupies when the dough is arranged in bake-pans supported by the rack and in dotted lines in the position which it occupies when the dough is arranged in the dough-tray. Fig. 3 is a transverse section taken in the plane indicated by the line 3 3 of Fig. 2.

Similar reference characters indicate corresponding parts in all the figures of the drawings.

The cabinet embodying my invention is divided interiorly to form a flour receptacle or compartment 1, beneath which is fitted a drawer 2, and a dough-raising compartment 3, separated from the flour compartment or receptacle by a vertical partition 4, and both dough-raising and flour compartments are covered by a hinged lid 5, adapted to perform the additional function of a kneading-board and adapted, when opened to perform said second function, to be supported by brackets 6, hinged to the rear wall of the cabinet. Additional auxiliary pan-supporting shelves 7 are hinged upon the side walls of the cabinet and are supported in their operative positions by means of brackets 8. Also access to the dough-raising compartment near its bottom is had by means of a hinged door 9, having a transparent, preferably glass, panel, through which the contents of the dough-raising compartment may be viewed without opening the door, and thereby change the temperature of the compartment.

Arranged adjacent to the plane of the upper edges of the cabinet-walls are transverse tray-supporting strips 10 and longitudinal supporting-strips 11, the latter being provided with series of ventilating-openings 12, over which extend slides 13, dovetailed or countersunk in grooves in the upper sides of the bars 11 and provided with openings 14 to register with those in the bars 11. Said slides are adapted for longitudinal movement to cause the registration or non-registration of their openings with those of the bars to allow the cut off and circulation of air between the portions of the dough-raising compartment below and above the tray-supporting strips. Removably seated upon said tray-supporting strips or bars is a dough-tray 15, the top of said tray snugly filling the space between said strips, whereby when in place the only communication between the portions of the dough-raising compartment above and below the plane of said strips is by way of the slide-controlled ventilating-openings formed in the strips 11.

Arranged near the bottom of the dough-raising compartment are opposite rabbeted supporting-strips or guide-ledges 16, adapted for the reception of a flat hot-water receptacle 17, provided at its front edge with a handle 18 to facilitate its introduction and removal and closed at its top to prevent the escape of steam or moisture, said top being provided with an opening fitted with a removable or screw cap 19, whereby hot water may be introduced. Also above the plane of the slides 16 is a pair of guide-ledges or supporting-strips 20, adapted to support a rack 21, upon which bread-pans 22 may be arranged after the dough has been kneaded and molded for raising preparatory to the baking operation. When the bread-pans are arranged upon the tray 21, the hot-water receptacle 17 should be arranged on the lower ledges 16, as shown in full lines in Fig. 2. Also contiguous to the plane of the bottom of the dough-tray 15 is a pair of ledges or supporting-strips 23, adapted to support the rack 21 and the hot-water receptacle 17 during the initial raising of the sponge in the dough-tray 15, as shown in dotted lines in Fig. 2.

The dough-tray 15 is adapted to perform the function of a mixing-receptacle, and as the open-topped flour-receptacle is arranged within convenient reach of the operator it will be obvious that this portion of the bread-making process is facilitated. After the completion of the mixing operation the sponge remaining in the dough-tray is caused to rise by arranging the hot-water receptacle upon the rack 21, supported by the ledges 23, the ventilating-openings 12 being open to allow the communication of heat to the portion of the dough-raising compartment above the plane of the strips 10 and 11. After the completion of this initial dough-raising operation and the subsequent molding of the dough the latter in the bake-pans will be arranged upon the rack 21, supported by the ledges 20, and the hot-water receptacle 17 should be disposed on the lower ledges 16, the ventilating-openings 12 being closed by means of the slides 13. During this portion of the operation the condition of the dough may be viewed through the transparent panel of the door 9.

Thus it will be seen that the arrangement of the parts in the dough-raising cabinet embodying my invention is compact, that the number of the separate parts is small, and that when not in use as a dough-raiser the cabinet may be employed as a receptacle for bread after having been baked, and also that various changes in the form, proportion, and the minor details of construction may be resorted to without departing from the spirit or sacrificing any of the advantages of the invention.

Having described my invention, what I claim is—

1. A dough-raising cabinet having a compartment provided near its top with horizontal dough-tray-supporting strips having beveled downwardly-convergent inner edges, and also having vents 12, a vent-controlling slide mounted upon each strip and provided with openings for registration respectively with the vents, a dough-tray having downwardly-convergent side walls for contact with the beveled inner edges of said supporting-strips, and adapted to fit snugly in a plane near the upper edges of said walls between said strips, and subjacent ledges arranged in said compartment for supporting a tray containing a heating agent, substantially as specified.

2. A dough-raising cabinet having a compartment provided near its top with supporting-strips having beveled inner edges and series of vents, perforated vent-controlling slides countersunk in said strips with their upper surfaces flush with those of the strips, a dough-tray having downwardly-convergent side walls fitted adjacent to their upper edges between said strips and in contact with the beveled inner surfaces thereof, upper, lower and intermediate sets of horizontal supporting-ledges arranged in said compartment below the plane of the supporting-strip, and a rack and a hot-water receptacle adapted to be supported interchangeably by said sets of ledges, substantially as specified.

In testimony that I claim the foregoing as my own I have hereto affixed my signature in the presence of two witnesses.

LUCIOUS D. BURLINGHAM.

Witnesses:
WILLIAM SPENCER,
A. BRUBAKER.